C. E. COCHRAN

TRUCK FOR HANDLING PAPER ROLLS AND OTHER ARTICLES

April 14, 1931. Re. 18,042

Original Filed Aug. 19, 1921 10 Sheets-Sheet 1

INVENTOR

Clyde E. Cochran,

BY Barrs & Macklin,

ATTORNEYS

C. E. COCHRAN

TRUCK FOR HANDLING PAPER ROLLS AND OTHER ARTICLES

April 14, 1931. Re. 18,042

Original Filed Aug. 19, 1921 10 Sheets-Sheet 2

INVENTOR

Clyde E. Cochran,

By Baldwin & Macklin,

ATTORNEYS

C. E. COCHRAN

TRUCK FOR HANDLING PAPER ROLLS AND OTHER ARTICLES

April 14, 1931. Re. 18,042

Original Filed Aug. 19, 1921 10 Sheets-Sheet 3

INVENTOR

Clyde E. Cochran,

BY Bates & Macklin,

ATTORNEYS

C. E. COCHRAN

TRUCK FOR HANDLING PAPER ROLLS AND OTHER ARTICLES

April 14, 1931. Re. 18,042

Original Filed Aug. 19, 1921 10 Sheets-Sheet 4

INVENTOR
Clyde E. Cochran
BY Baker & Macklin
ATTORNEYS

C. E. COCHRAN

TRUCK FOR HANDLING PAPER ROLLS AND OTHER ARTICLES

April 14, 1931. Re. 18,042

Original Filed Aug. 19, 1921 10 Sheets-Sheet 5

Inventor
Clyde E. Cochran
By Burton J. Macklin,
Attys.

C. E. COCHRAN
TRUCK FOR HANDLING PAPER ROLLS AND OTHER ARTICLES
April 14, 1931. Re. 18,042
Original Filed Aug. 19, 1921 10 Sheets-Sheet 6
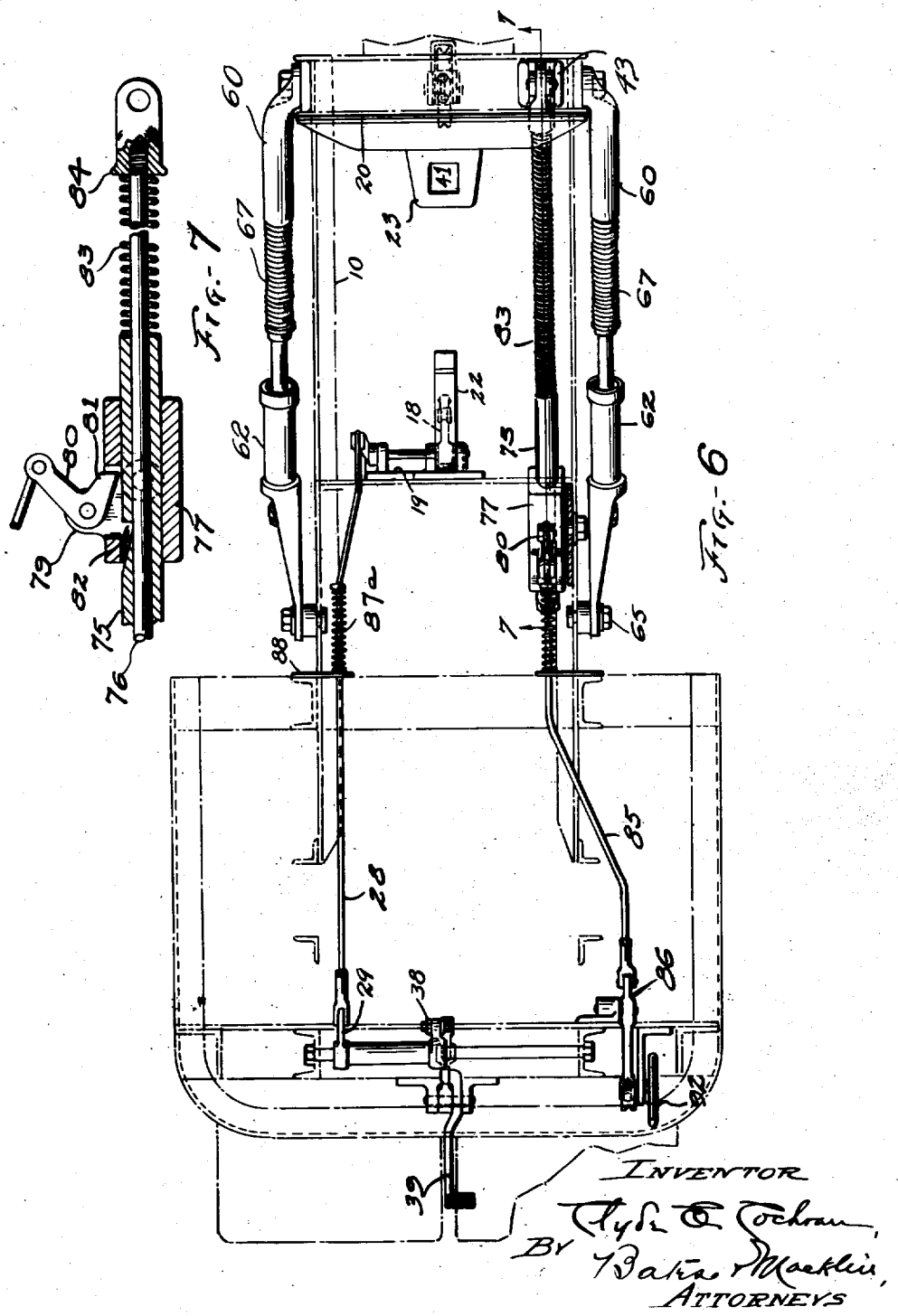

C. E. COCHRAN

TRUCK FOR HANDLING PAPER ROLLS AND OTHER ARTICLES

April 14, 1931.

Re. 18,042

Original Filed Aug. 19, 1921 10 Sheets-Sheet 7

Inventor
Clyde E. Cochran,
By Barton & Macklin
Attys.

C. E. COCHRAN
TRUCK FOR HANDLING PAPER ROLLS AND OTHER ARTICLES

April 14, 1931.

Re. 18,042

Original Filed Aug. 19, 1921 10 Sheets-Sheet 8

Inventor
Clyde E. Cochran
By Baker & Maxlin
Attys.

C. E. COCHRAN
TRUCK FOR HANDLING PAPER ROLLS AND OTHER ARTICLES

April 14, 1931. Re. 18,042

Original Filed Aug. 19, 1921 10 Sheets-Sheet 9

Inventor
Clyde E. Cochran
By Baker & Maxwell
Att'ys.

C. E. COCHRAN

TRUCK FOR HANDLING PAPER ROLLS AND OTHER ARTICLES

April 14, 1931. Re. 18,042

Original Filed Aug. 19, 1921 10 Sheets-Sheet 10

INVENTOR

Clyde E. Cochran,

By Bates & Macklin,

ATTORNEYS

Reissued Apr. 14, 1931

Re. 18,042

UNITED STATES PATENT OFFICE

CLYDE E. COCHRAN, OF CLEVELAND, OHIO, ASSIGNOR TO THE ELWELL PARKER ELECTRIC COMPANY, OF CLEVELAND, OHIO, A CORPORATION OF OHIO

TRUCK FOR HANDLING PAPER ROLLS AND OTHER ARTICLES

Original No. 1,533,168, dated May 19, 1925, Serial No. 493,703, filed August 19, 1921. Application for reissue filed March 6, 1929. Serial No. 344,902.

This invention relates to an automobile truck provided with mechanism for receiving a load and moving it through two stages of operation into transportable position, and after transportation, depositing it.

The mechanism herein shown constitutes an improvement on the mechanism shown in my Patent No. 1,531,735 granted March 31, 1925, to The Elwell Parker Electric Company, as assignee. The present improvements relate particularly to mechanism for controlling a load such as a cylindrical paper roll, whereby the load may be readily handled under greatly varying circumstances.

The general object of the invention is to provide simple and efficient power driven mechanism for raising and positioning the load and effectively carrying it during transportation and readily depositing it under the accurate control of the operator.

More particularly my invention provides a truck equipped with a flexible member extending over a suitable boom hinged at its lower end to the truck frame, the load being received in a suitable support pivoted to the lower end of the boom. The flexible member first raises the load whether picked up from a recumbent or vertical position by tipping the boom over the truck body and then upends the load, if necessary, by rotation of the pivotal support into a convenient transportable position. The arrangement is such that after transportation the load may be deposited in either a vertical or recumbent position. A suitable spring mechanism is arranged to support the tipped boom and automatically return it to load-discharging position, when the relaxing of the flexible member permits such movement.

A further object is the provision of simple and efficient means whereby a load on an automobile truck may be deposited in vertical or horizontal position as desired.

My invention may be embodied in a truck adapted for receiving, elevating and up-ending paper rolls, and transporting them and thereafter depositing them.

The above features and others contributing to the efficiency of the machine are hereinafter more fully explained in connection with an approved embodiment as shown in the accompanying drawings. The essential characteristics of my invention are summarized in the claims.

In the drawings, Fig. 1 is a side elevation of the truck with the parts in position just after receiving the load, in this case a paper roll lying horizontally.

Fig. 6 is a plan view of the boom actuating and control mechanism, while Fig. 7 is a cross section substantially along the line 7—7 of Fig. 6.

Figure 1:
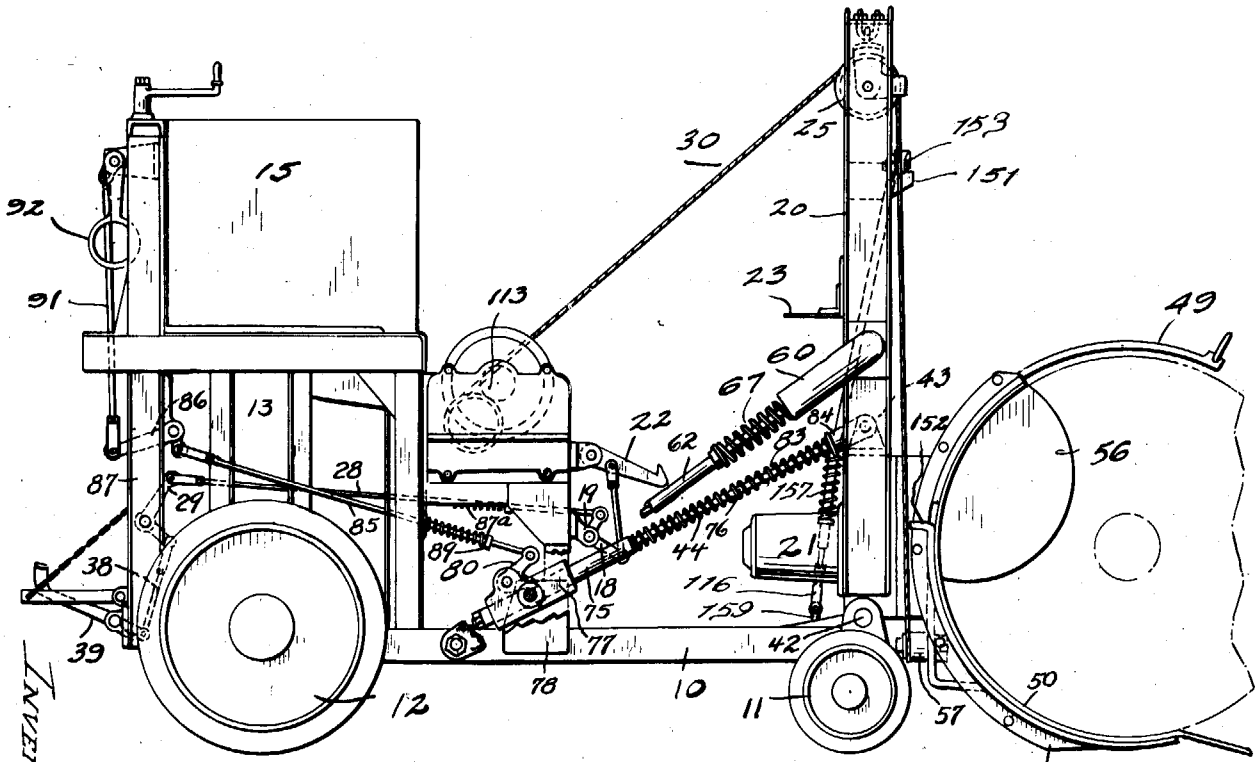

As shown in Figs. 1 to 4, 10 indicates the frame body of a truck which is supported by rear wheels 11 and forward wheels 12. These forward wheels are on opposite sides of a front housing 13 composed of upright and transverse members secured to the frame members 10. This housing may carry a suitable motor (not shown) for driving the front wheels. The truck may be steered by any suitable mechanism, not shown. On the upper part of the front housing is a casing 15 which may receive a storage battery for driving the truck, and for operating a cable-winding mechanism hereinafter described.

The construction of the frame, wheels, housing, etc., above mentioned, does not enter into the present invention. They may if desired be formed according to Patent No. 1,260,145, granted March 19, 1918, to the Elwell-Parker Electric Company as assignee of Clyde E. Cochran.

In the present invention, I hinge to the rear end of the truck frame 10 a boom 20. This is composed of an approximately upright member, shown as an outwardly facing channel beam bent into suitable shape and suitably braced by a cross member as at 23. It will be noted that the frame is somewhat A shaped and between the arms of the A and rigidly secured to them at their lower ends is a casting 21, which is pivoted at 42, on a horizontal pivot, to the truck frame.

The casting 21 is provided with bearings adapted to receive in pivotal relation the stub shaft or axle of a second casting 45 to which is suitably secured a scoop 50, the casting 45 and scoop 50 together constituting a support on which the load, as for instance, a paper roll, may be rolled and thereafter tilted into substantially upright position.

The casting 21 is preferably substantially rectangular, having an elongated hub 16 extending forwardly around a central opening. The lower corners are provided with ears 17 adapted to be received on a shaft 42 secured to the rear end of the truck body 10. The sides may be suitably flanged to receive the ends of the bent channel beam constituting the A-frame boom 20, which may be secured thereto in any desired manner.

Figure 8:
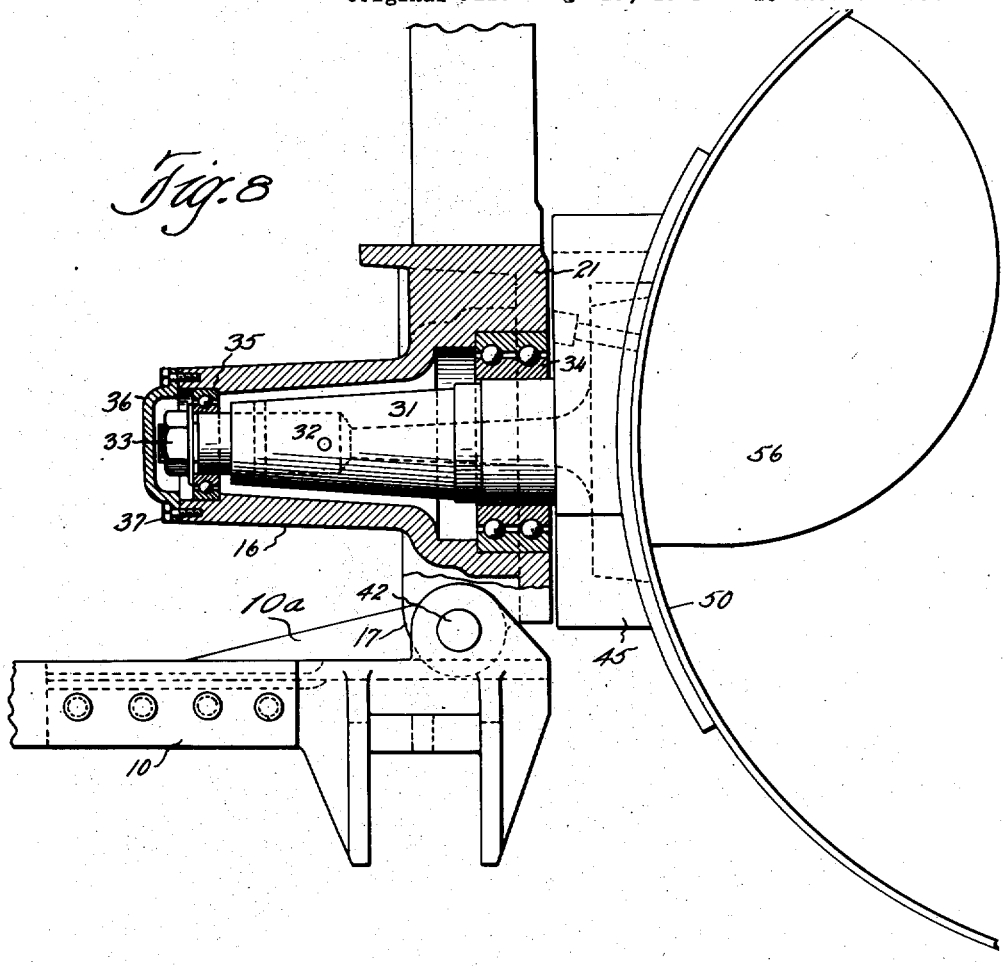
Fig. 8 is an enlarged view in side elevation, parts being shown in section, showing in detail the hinged connection of the boom with the rear end of the truck, and the pivotal arrangement of the load-receiving member at the lower end of the boom.
Figure 9:
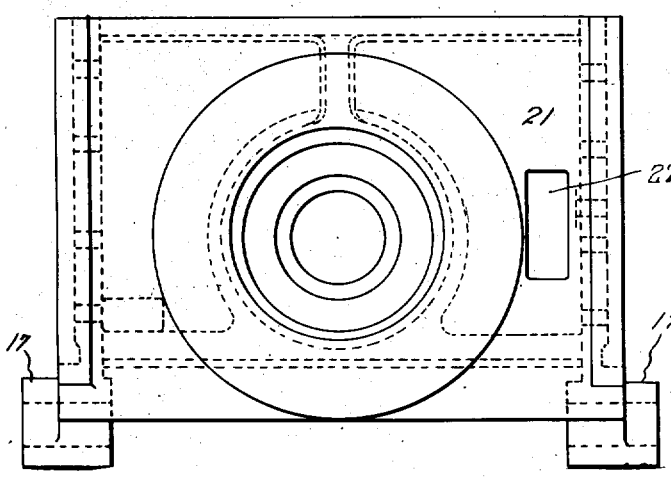
Fig. 9 is a front elevation of the casing constituting the lower end of the boom for receiving the pivotal paper roll support.
Figure 11:
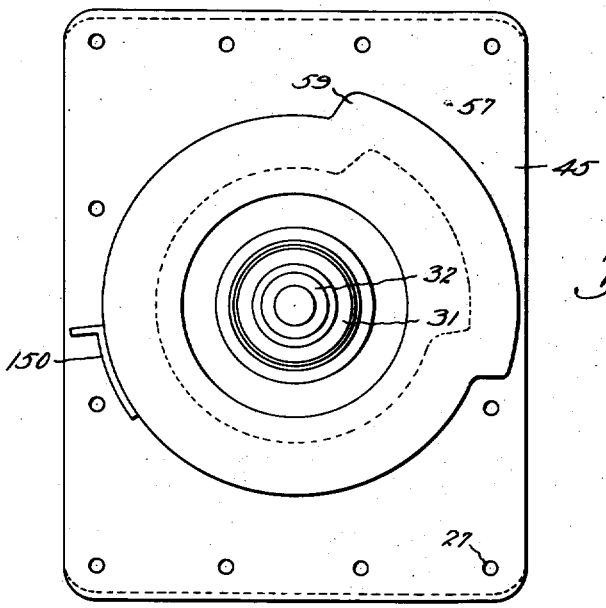
Fig. 11 is a front elevation of the pivotal paper roll support.
Figure 10:
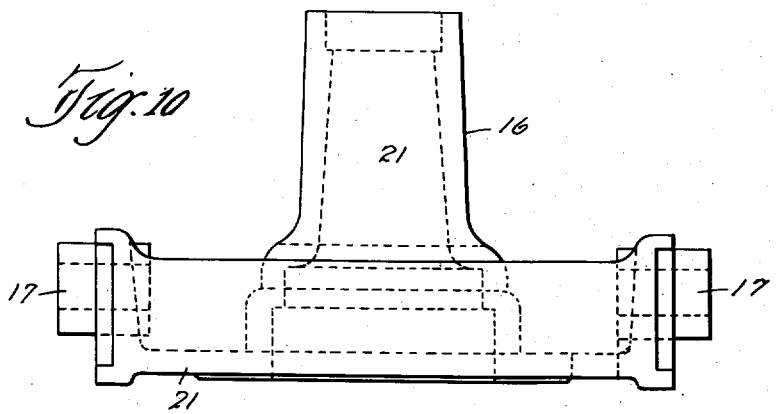
Fig. 10 is a plan of the same.

The load supporting member preferably consists of the casting 45 illustrated in Figs. 8 and 11 and it is suitably secured by bolts or rivets passing through holes 27 to the arcuate scoop 50 having a partially closed end 56 and projecting lugs 57 mounted on suitable plates 55 which are secured to the scoop 50. Projecting forwardly from the center of the casting 45 is a tapered hollow stub shaft or axle 31, having inserted at the forward end a hardened steel pivot 32 provided with a reduced threaded end adapted to receive a nut 33.

The stub shaft 31 is adapted to rotate in ball races 34 within the rear portion of the casting 21, while the forwardly extending pivot 32 has a bearing within ball races 35. A protecting cap 36 may be secured as by bolts 37 to the outer end of the hub 16.

Depending from the top portion 24 of the boom at the junction of the arms of the A-frame is a pulley block 25 over which extends a cable 30. One end of this cable passes to a suitable winding drum as illustrated at 113 in Figs. 1 to 4. The other end of the cable may be suitably attached to either of the lugs 57 on the scoop 50.

Figure 2:
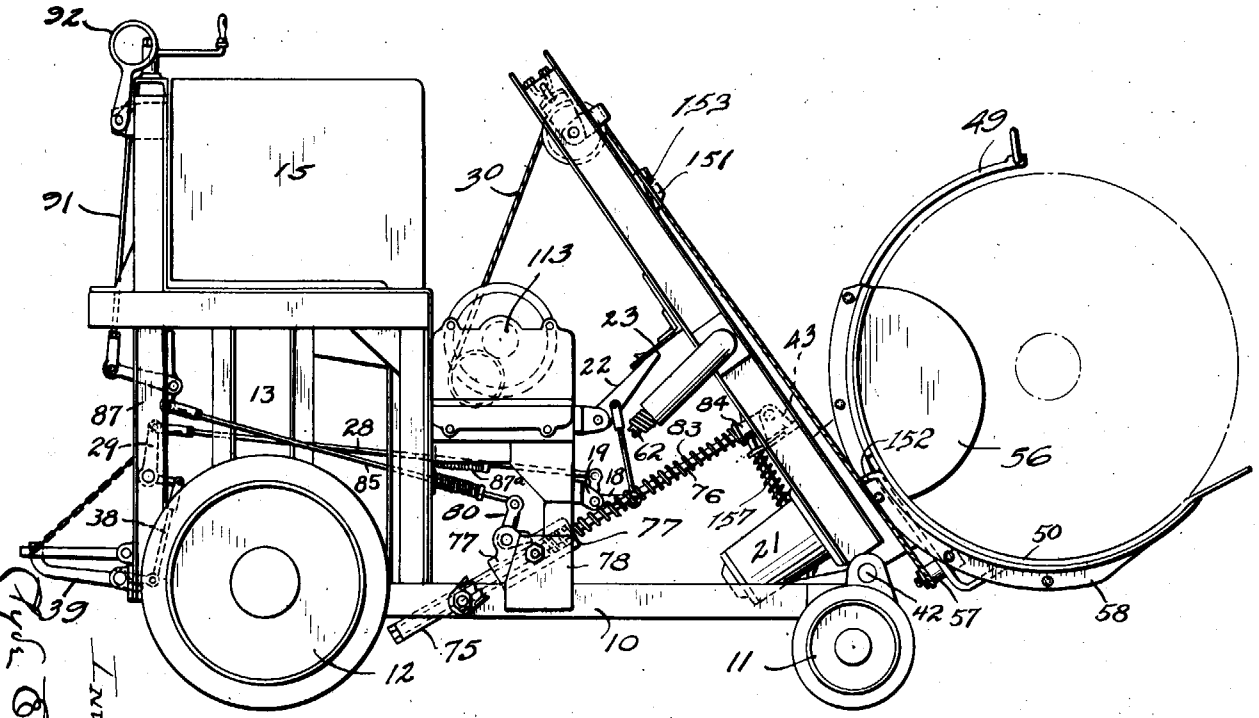
Fig. 2 is a similar view showing the parts in position with the boom tipped and the load still horizontal in extreme elevated position.
Figure 3:
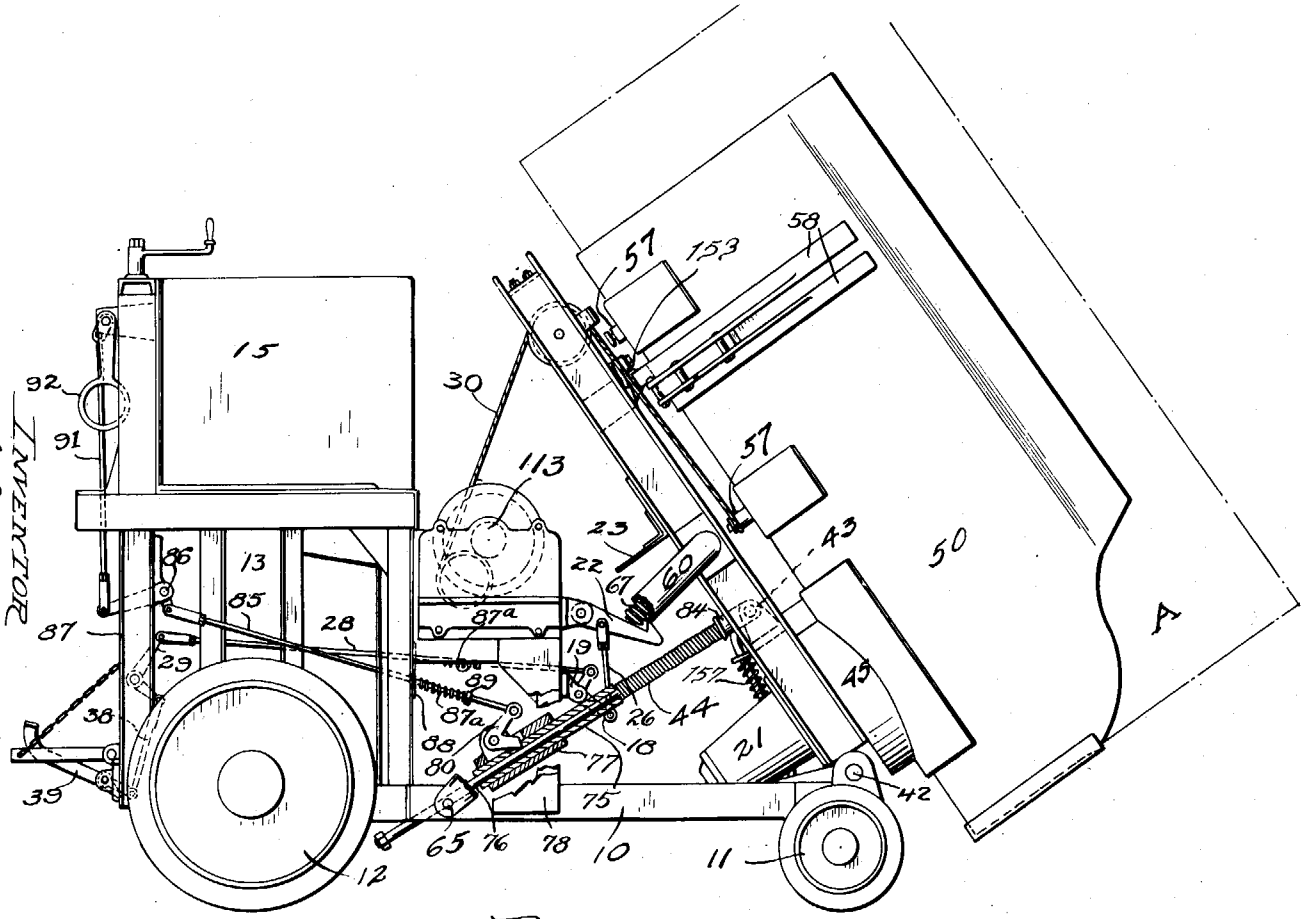
Fig. 3 is a similar view showing the parts in position for transporting the load, the load having been rotated into up-ended position.

By properly locating the lugs 57 with relation to the center of gravity of the load the moments acting on the scoop 50, due to the drawing in of the cable 30 when attached to the lug 57 can be so determined that the rotation of the winding drum 133 will first tip the boom forwardly over the rear portion of the truck, as shown in Fig. 2, with the load remaining in the horizontal position and upon a further drawing in of the cable 30 the scoop and load will be rotated in the bearings 34 and 35 until the load will be upended into a substantially upright position as shown in Fig. 3, the ear 152 and lug 151 acting as a positive stop.

The pivotally supported casting 45 is provided with a shoulder 59 which is in the position as illustrated in Fig. 11 when the scoop is horizontal as in Figs. 1 and 2. The shoulder 59 is adapted to engage and operate automatic mechanism for controlling the cable which will be hereinafter more fully described.

Any suitable securing means may be used to secure the load on the scoop. I have provided, therefore, a load retaining latch 49 which is slidably mounted between the arcuate ribs 58 and engages a substantial portion of the circumference of the roll when drawn out to the roll locking position.

Figure 4:
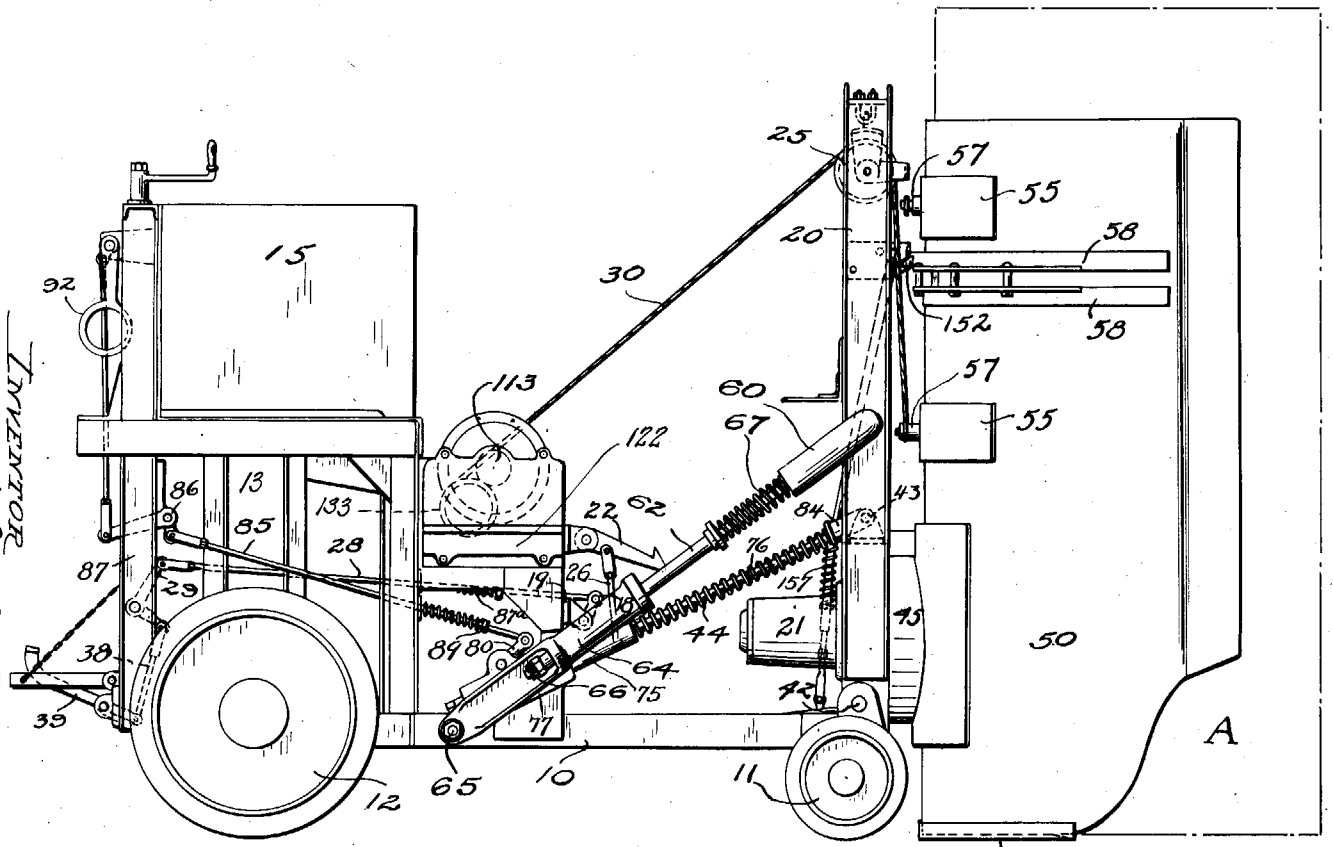
Fig. 4 is a similar view showing the parts in position with the boom in original position and the load in vertical positon about to be discharged.
Figure 5:
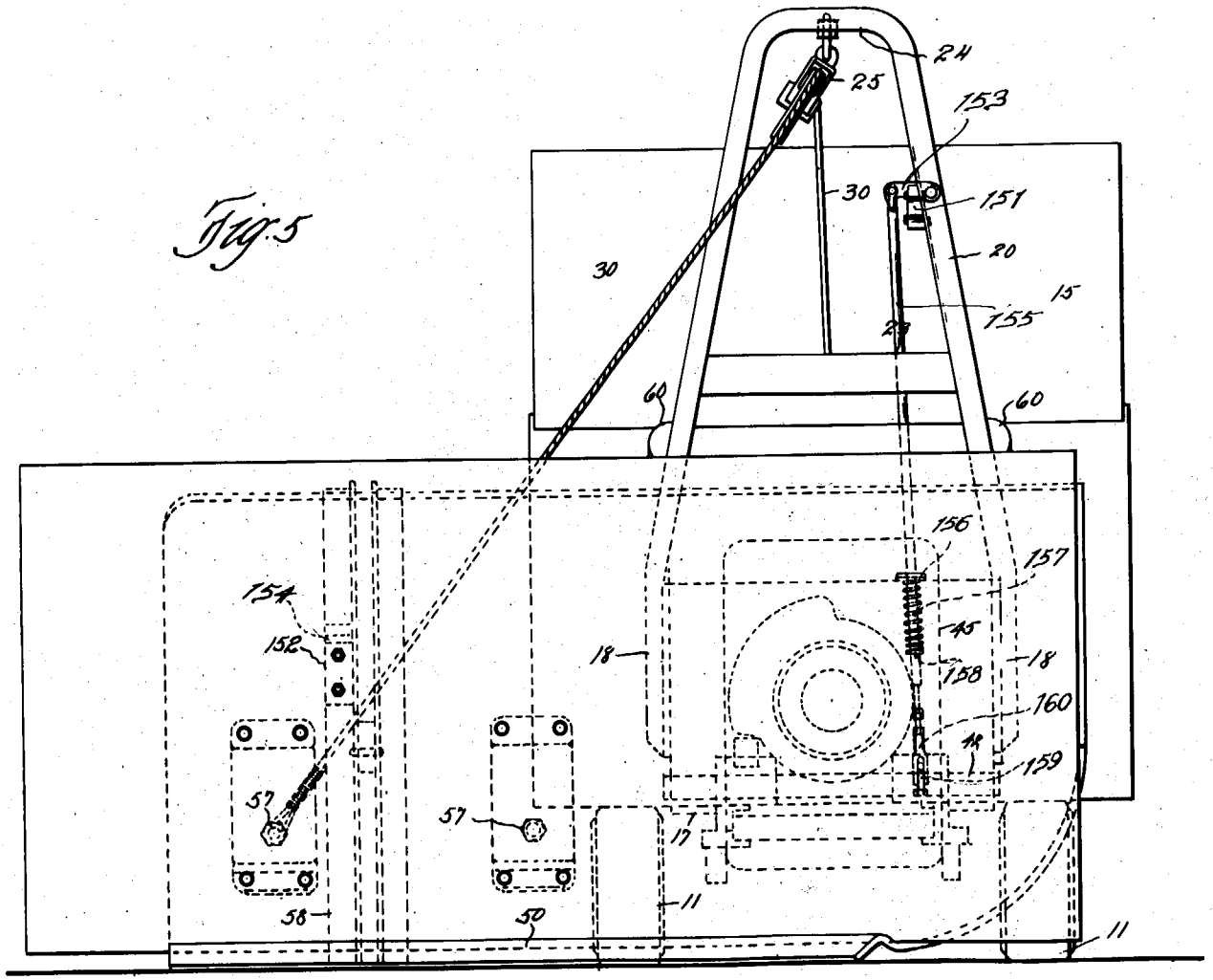
Fig. 5 is a rear elevation of the truck and load in the position described in Fig. 1.

On each side of the boom I provide a suitable resilient connection secured to the truck frame in front of the pivot 42. As illustrated in Fig. 4, I preferably pivot to each arm of the A-frame constituting the boom, the upper ends of the tubular sockets 60. Extending from these socket members, and coaxially therewith, are rods 62. These rods extend loosely through tubular heads on partially tubular members 64, pivoted at 65 to the frame 10. On the lower ends of the rods 62 are nuts 66 limiting the upward movement of the rods. Surrounding the reduced upper ends of the rods and bearing against collars formed at the junction of the reduced and full sized portions of the rods and extending into the bore of the members 60 and seated against the far end of such bore, are compression springs 67.

The construction described provides two lateral tie members for the boom adapted to limit its outward swing to substantially vertical position, as shown in Figs. 1 and 4. These springs provide an elastic cushion for the boom when it is drawn forwardly by the cable to the transporting position over the truck frame, the rods 62 telescoping within the tubular members 60 and 64, allowing the socket member 60 to approach the tubular member 64.

To obtain an efficient mechanism for handling either a vertically or horizontally disposed load, properly position it upon the truck and then deposit it in either a vertical or horizontal position, the boom and scoop must, at certain times, be operable independent of each other. For instance, it is quite necessary that the scoop be arranged to pick up a horizontally disposed load from which it may be elevated to a transportable position, as shown in Fig. 3, and then may be again lowered to the horizontal position after having been transported. The boom should be retained in a tipped position during this scoop lowering period after which it should be swung outwardly in order to deposit the load.

A second condition to be fulfilled is that present when a horizontally disposed load is to be picked up by the scoop, positioned for trasportation, transported, and then deposited in an up-ended or vertical position, as illustrated in Fig. 4. A third condition is wherein a vertically disposed load is to be picked up, as shown in Fig. 4, tilted to transporting position, transported, lowered to horizontal position and then unloaded. A fourth condition occurs when a vertically disposed load is to be picked up by the scoop, transported, and deposited in a vertical position.

Since it is usually necessary that the truck shall return to the loading place in an empty or unloaded condition, all of the foregoing loading and unloading movements of the scoop must likewise be obtained when the truck is empty.

I have found that in order to have the truck fulfill the aforesaid conditions under which it is to handle a load it is necessary to have means for retarding the outward movement of the boom when the flexible member 30 is payed out by the winding mechanism 113. Such mechanism is particularly required, for instance, when the truck is to pick up a load from a horizontal position, transport it and then unload it in a horizontal position.

In order to rotate the scoop when in the vertical or horizontal loading position, it is quite essential that the scoop be first elevated to clear the floor. This requires that the boom must be retained in the inclined transporting position during the period the scoop is being revolved from the inclined transporting position, as shown in Fig. 3 to the horizontal position as shown in Fig. 2. This condition must also be fulfilled when a vertically disposed load is to be picked up, transported and then lowered to the horizontal position.

To meet the requirement of having the revolving movement of the loading scoop independent of any movement of the boom I have provided latching means shown as a pivotally mounted engaging member 22 adapted to engage a lock plate 23 rigidly secured to the boom. The member 22 may be actuated by a bell crank lever 18 pivotally mounted in a suitable bearing 19 and which is attached to an adjustable connecting rod 26. This bell crank may be shifted by a longitudinally disposed rod 28 extending to the fore part of the truck whence it is connected to another bell crank lever 29, pivotally mounted on the vertical frame member 87. The latter bell crank may be shifted by a downwardly extending connecting rod 38 connected to a foot lever 39 positioned adjacent the truck foot levers of the usual type.

By such a control mechanism, the outward movement of the boom may be retarded at the operator's will by manipulating the foot lever 39, which thereby raises the member 22 into engagement with the member 23. I prefer to have the opening 41 in the member 23 of sufficient size to permit a slight movement of the boom before the member 22 becomes engaged therewith, to facilitate the engaging and disengaging of these members.

As the scoop is elevated to vertical position by the flexible member 30 and winding mechanism 13 the boom will be displaced inwardly a slight distance upon the completion of the scoop movement, whence the member 22 may drop out of engagement with the lock member 23. This final movement of the boom also compresses the springs 67 disposed on the telescoping members 62.

Since the boom and scoop always have a tendency to rotate to a vertical position when loaded no further mechanism is necessary to obtain the complete cycle of movements required to handle vertically or horizontally disposed loads.

The operation of the boom when the truck is empty cannot be efficiently controlled unless additional means is provided to quickly initiate the outward movement of the boom to vertical position. This is due to the fact that when the truck is loaded the resultant center of gravity of the boom, scoop and load is so near the pivotal axis of the scoop that the turning movement tending to rotate the loaded scoop to a horizontal position is considerably less than when the scoop is empty. Hence by quickly displacing the boom outwardly to the vertical position sufficient tension may be maintained in the flexible member 30 as it is being payed out by the winding mechanism 13 to hold the scoop immovable on the boom during the outward movement of the latter.

A very convenient manner of obtaining this result is to provide a rod member 76 carrying a spring 83 which is adaptable to shift the unloaded boom about the boom pivot 42. One end of this member may be secured to a connecting member 84 which may be pivotally secured to the lower part of the boom in a suitable bearing 43 mounted on the upper part of the scoop bearing casting 21. The actuating member is provided with a compression spring member 44 arranged to be compressed between the boom and the body of the truck.

As it is desirable to utilize the force in the spring only when the truck is empty I have provided means operative at will for compressing the spring. The means shown comprises a notched sleeve 75 mounted upon the free end of the rod member 76 and adapted to slide in a pivotally mounted bearing 77 secured to the frame member 10 by a supporting plate member 78. Projecting portions 79 integral with this bearing are adapted to pivotally support a dog lever 80. The lower end 81 of this lever may be shaped to provide a pawl adaptable for engaging a notch 82 formed in the sleeve 75.

The resilient member 83 may abut the enlarged portion 84 of the member 76 at one end while the other end may abut the upper end of the notched sleeve 75.

It is to be seen that as the boom is inclined forwardly from a vertical position by the cable, the spring will not be compressed unless the sleeve 75 is held stationary, by the dog 81 engaging the sleeve in the notch 82 in the sleeve. If it is desired to incline the boom without compressing the spring 83 the operator may shift the dog lever 80 out of engagement with this notch by a suitable connecting rod 85, connected to a bell crank lever 86 secured to the frame member 87 in the front of the truck. A spring 87*a* which indirectly maintains the dog in an engaging position is thereby compressed between the guide plate 88 rigid with the truck frame and a collar 89 rigid with the connecting rod. The crank member 86 may be shifted by an adjustable connecting link 91 connected to a control lever 92 positioned near the top of the truck. I prefer to arrange this control lever to have a movement 180° so that when in an upward position the end of the link 91 connected therewith passes the center of the lever pivot and the lever will consequently remain in this elevated or releasing position.

By lowering the control lever the dog is dropped to an engaging position on the sleeve 75. Hence, while in this position, the operator may start the widing mechanism, upon which the boom will be inclined inwardly by the cable 30 and the dog 81 will be engaged in the notch 82 and the spring member 83 will be compressed between the end of the sleeve and the shoulder 84 of the member 76.

When the operator desires to tilt the empty scoop into vertical position he releases the winding mechanism to pay out the flexible member 30, upon which the spring 83 will react to urge the boom and scoop outwardly and maintain the flexible member taut during this outward movement thereby maintaining sufficient tension in the flexible member 30 to hold the scoop and prevent it from dropping to the horizontal position. Hence, as the boom is displaced toward the vertical position the bottom of the scoop comes to rest upon the floor thereby preventing rotation about its pivotal axis.

While not necessary, it is desirable that locking means be provided to positively lock the scoop to the boom during this tilting movement. A convenient manner of locking the boom to the scoop is to provide a latch member 153 pivotally mounted on the outer face of the boom which is adapted to engage a stop lug 154, another function of which will be hereinafter described. The engagement and disengagement of the latch 153 may be automatically obtained by a downwardly extending actuating rod 155, which is pivotally attached to the outer end of the latch 153. This rod may have a suitable guide plate 156 secured to the boom frame which also serves as a retaining means for holding the spring 157 in a compressed condition on the rod and near the lower end thereof.

The other end of this spring may abut a collar 158 secured to the lower end of the rod. An adjustable member 160 may be mounted on the end of the rod which is pivotally engaged by a stud member 159 rigid with the end member 10*a* of the truck. Hence, as the boom is tilted inwardly to an inclined position, the latch member 153 is rotated out of engagement with the lug 154 and the boom is free to rotate on its pivotal axis. This disengagement will not take place however, only when the inward movement of the boom is nearing completion. It is to understood that this locking mechanism is out of engagement only during the period when it is possible to lock the boom in a tilted position by the dog 22.

In Fig. 1, the dot and dash lines indicate a paper roll lying horizontally in the scoop 50. The lugs 57 are located on the scoop 50 as hereinbefore stated in such a manner that a tilting movement of the load will take place before the load rotates on the pivot 45. I have found that such an arrangement requires one or more terminals or lugs for the cable 30 and the end of the cable is attached to the upper or lower lug 57 in accordance with the length of the paper roll being handled.

When the roll has reached the up-ended position shown in Fig. 4 the shoulder 59 see Fig. 11 will have rotated sufficiently to engage a bell crank lever 68 which automatically opens a switch controlling the winding drum. The load is now in position for transportation by the truck as desired.

It will be seen that with the mechanism described, the truck may be backed into position adjacent to a horizontal paper roll and the latter rolled into the scoop. The scoop may be designed so that the truck may approach articles to be loaded with sufficient speed to deposit or scoop them onto the support.

Any suitable winding mechanism may be provided for pulling in and paying out the cable 30. We find it very convenient to use an electric winch for this purpose, which includes a winding drum, a motor geared to it and suitable mechanism whereby the device may be self-locking whenever the motor rotation stops, but enabling the winding in at will and also the paying out of the cable whenever desired, by rotating the drum in the unwinding direction faster than gravity acts and the action of the springs 67 tends to rotate it.

Figure 12:
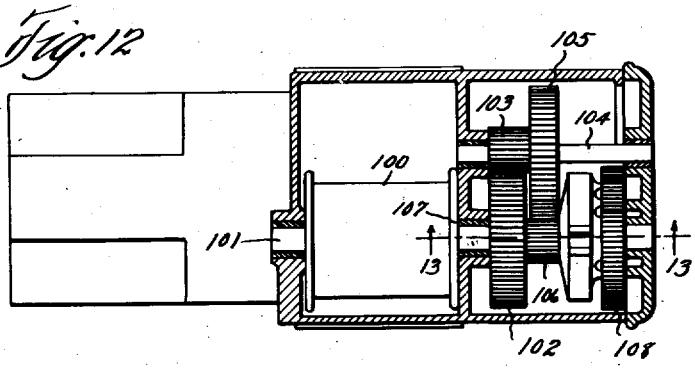
Fig. 12 is a detail in horizontal section, illustrating the winding mechanism which may be employed.
Figure 13:
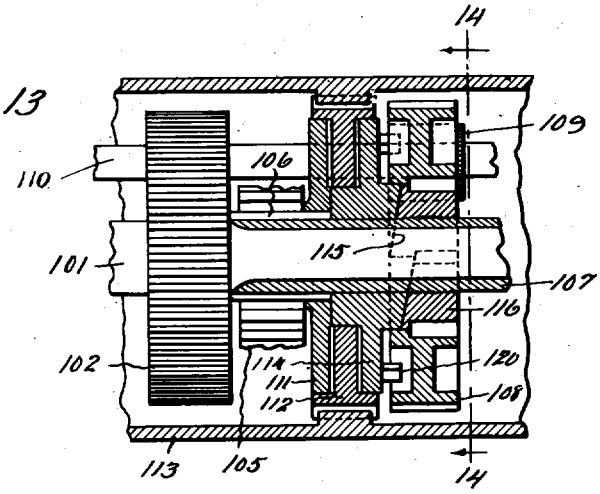
Fig. 13 is an enlarged vertical section of the winding mechanism taken on the line 13—13 of Fig. 12.
Figure 14:
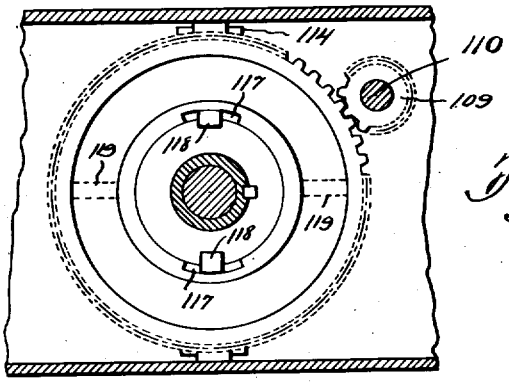
Fig. 14 is a transverse section of the winding mechanism taken substantially along the line 14—14 of Fig. 13.

A convenient form of winding mechanism as above outlined (but which is not per se a part of this invention) is illustrated in Figs. 12, 13 and 14, where the winding drum 100 is on a shaft 101 which carries a spur gear 102 meshing with a pinion 103 and mounted on a sleeve 107 which is loose on the shaft 101. Surrounding the sleeve 107 is a spur gear 108 which is connected with the sleeve by means allowing independent movement for only a fraction of a rotation. This gear 108 meshes with a pinion 109 on an extension of the armature shaft 110 of a motor (not shown). Between the gear 108 and the pinion 106 is a friction brake effective whenever the raising rotation stops. This consists, as shown, of a disc 111 rigid with the sleeve 107, an annular friction member 112 alongside of the disc and held stationary by engagement with the casting 113 of the winding mechanism, and an annular cam member 114 on the other side of the friction member 112 and loosely splined on the sleeve and having on its outer side a face cam 115. This cam is adapted to be abutted by a complementary cam 116 which is rigid on the sleeve 107 and has a portion extending within the spur gear 108. The gear 108 has notches 117, Fig. 13, which are occupied by lugs 118 on the cam member 116 to allow some freedom of movement between the gear and cam member.

After this freedom is taken up in the raising rotation of the gear, the gear drives the cam member 116, and this, by reason of the direction of the inclines, frees the face cam 115 from braking friction and positively carries it around by reason of the engagement of the shoulders on the two cams.

It will be seen, therefore, that in the raising direction the mechanism provides first for relieving the brake, and then for furnishing a direct train of spur gearing between the armature and the raising drum. When the raising rotation ceases the tendency of the load is to rotate the train of gears in the opposite direction, and as the gear 108 moves in this backward direction the brake member 114 lags behind it so that the brake becomes applied by reason of the inclined action of the cams and the load is held.

To lower the load the armature is simply driven in the reverse direction from the raising movement. This turns the gear 108 backwardly faster than the load would turn it, and in this movement webs 119 on this gear engage lugs 120 on the cam member 114, and carry it around so that the brake is not applied. The engagement of the webs 119 with the lugs 120 takes place before the other ends of the notches 117 engage the lugs 118. Whenever this lowering rotation of the armature stops, the tendency of the load to pull the train of gearing applies the brake, as already described.

It will be realized from the above description that the device illustrated is self-locking whenever the motor rotation ceases, whether it has been raising or lowering the load. It is to be understood, however, that the winding mechanism so illustrated and described is simply set out by way of illustration, as any self-locking winding mechanism may be used.

The winding motor not shown may be supported on the bracket or base plate extending from the gear housing of the winding mechanism 113. All of these parts may be a self-contained unit mounted on a suitable platform 122 secured to the rear of the forward housing 13 and supported by it and by suitable struts 123 rising from the frame members 10. By supporting the winding winch directly behind the housing for the battery and driving motor and above the rear frame, it does not crowd the housing and is out of the way of the boom when tipped over as shown in Figs. 2 and 3, and at the same time the cable may pass directly from the winch to the top of the boom and obtain a sufficiently direct pull for readily tipping the latter.

As one of the uses of the present truck is for handling paper rolls, it is desirable to provide automatic mechanism to stop the inward swing of the boom at a definite point, thereupon tilt the roll into a substantially upright position and then stop the operation of the winding drum. It is desirable also to have the mechanism under the constant control of the operator for lowering the roll so that it may be gently deposited in an upright position from the truck. To effect the results enumerated, I provide a simple mechanism shown in Fig. 15 and which will now be described.

A suitable double-pole double-throw knife switch 130 is adapted to break the current on the elevating motor, the bottom position of the switch being for raising and the top position for lowering. The switch is operated by a push and pull rod 135, which carries an operating handle 145, and is connected with the arm 134 of a bell crank, pivoted at 133 on a bracket secured to the frame 13. The other arm 132 of the bell crank is connected by a link 131 with the switch. The rod 135 slides loosely through a suitably supported bracket 136 and has two collars 137 equally spaced on the rod from the bracket when the switch and associated parts are in open or neutral position. Surrounding the rod, between the collars 137 and the bracket 136, are compression springs 138 so that the handle can be moved in either direction only against the springs which tend to restore the handle to neutral position.

The knife switch is swung into raising position by an outward pull on the handle 145 which causes a downward pull on the link 131 though the bell crank described. Rigidly connected with the bell crank is a third arm 139 having secured thereto a collar 140 slidably receiving a rod 141 having adjustably fixed collars 142 and 143 thereon.

To start the raising operation the operator simply pulls out the handle 145. The motor now operates and winds up the cable 30, tipping the boom forwardly over the rear portion of the truck at the same time raising the paper roll. As the boom is coming into its final position with the roll disposed horizontally as shown in Fig. 2 as the drum 113 continues to draw on the cable the scoop containing the paper roll is then revolved about the pivot bearings 34 and 35 until it is tilted into up-ended position. As the boom approaches its extreme forward tipped position the rod 141 slides idly through the collar 140 until the fixed collar 143 thereon approximately reaches the collar 140.

Figure 15:
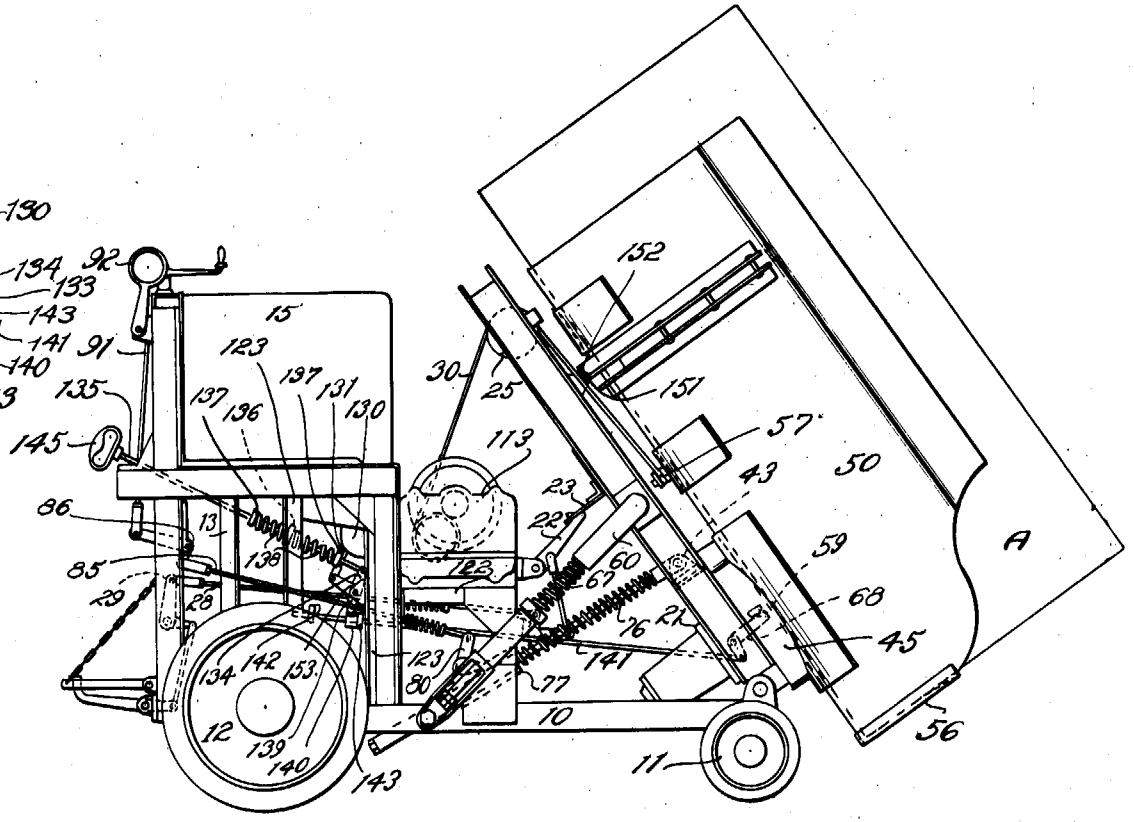
Fig. 15 is a side elevation of the truck and showing in detail means for automatically controlling the motor winding mechanism.
Figure 16:
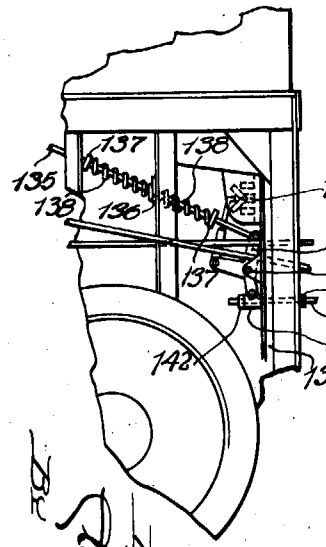
Fig. 16 is an enlarged view of the switch mechanism.

As the paper roll approaches its up-standing position the shoulder 59 strikes the upstanding arm on the bell crank 68 projecting through an opening 27 in the casting 21, and moves the arm 68 downwardly to the position shown in Fig. 15. This movement is transmitted through the rod 141, the collar 143 engaging and moving the collar 140 secured to the bell crank 132, thereby pushing the link 131 upwardly and moving the switch into neutral position. This opens the current to the motor and the self-locking mechanism retains the load in such position.

To lower the load the operator pushes in on the handle 145, which movement pushes the link 131 further upward and swings the knife switch 130 into its upper engagement to direct current in the reversing direction to the motor, which allows the cable to pay out, the load being lowered as long as the handle is held in. Whenever the operator relieves the force on the handle the springs 138 restore the handle to neutral position, which swings the switch open and stops the motor, and the self-locking mechanism holds the load.

From the foregoing description, it will be apparent that I have described a load handling device which is highly efficient for the purpose intended. The device is well adapted for handling heavy articles and can be operated in narrow aisles; can be quickly loaded and unloaded and requires but little attention.

I claim:

1. The combination of a truck, a boom pivoted thereto, rotatable load supporting means carried by said boom, winding mechanism carried by the truck, including a flexible member leading from the winding mechanism over the boom and connected to the load supporting means, whereby the boom may be tipped inwardly thereby raising the load, and locking means for holding the boom in said tipped position.

2. The combination of a truck, a boom pivoted thereto, a pulley mounted thereon, means for pivotally supporting a load with the axis thereof in vertical position on the boom, locking means secured to the truck adapted to engage the boom, winding mechanism carried by the truck, a pulley on the boom, a cable leading from the winding mechanism over the pulley on the boom and connected to the load supporting means, whereby the boom and load supporting means may be tipped inwardly.

3. The combination of a truck, a substantially vertical boom pivoted thereon, means for pivotally supporting a load with the axis thereof in vertical position on the boom, means for swinging the boom inwardly thereby raising the load and means to thereafter prevent return movement of the boom from its swung position, there being a movable support for the load on the boom, the movement being such as to allow the load to then swing into a position such that said axis is substantially horizontal.

4. The combination of a truck, a boom pivotally connected therewith, a load receiving member pivotally supported on the boom, means for tipping the boom inwardly to move the load receiving member therewith, and means for locking the boom in said tipped position, said first mentioned means being connected with the load receiving means in such manner as to control said receiving means for rotation on its pivot after such locking.

5. In a truck, a load supporting frame pivoted thereon, means to tilt said frame from a vertical to an inclined position, spring pressed means acting when the frame is tilted to urge the same to vertical position, and additional spring means arranged to be compressed by the tilting of the frame, and active in combination with the first mentioned springs to initiate the movement of the frame to a vertical position.

6. The combination of a truck frame, a boom pivoted to the truck frame, a load carrier pivoted to the boom, mechanism connected with the load carrier adapted in the first portion of its movement to tip the boom and in the latter portion of its movement to swing the load carrier on its pivot, and latching means adapted to restrain the movement of the boom upon a reverse movement of said mechanism.

7. The combination of a truck, a boom pivoted thereto, means for pivotally supporting a load in a position normal to the boom, means for tipping the boom inwardly and thereby raising the load and thereafter tilting the load into up-ended position, means for locking the boom in an inwardly tipped position, and means for shifting the boom outwardly when said locking means is disengaged from the boom.

8. The combination of a truck, a substantially vertical boom pivoted thereto, load supporting means pivotally mounted on the boom, means for swinging the boom inwardly and the load supporting means upwardly, means for locking the boom against outward movement and selective mechanism manipulated from the operator's position on the truck for selectively controlling the movements of all of the aforesaid means.

9. The combination of a truck, a boom pivoted thereto, means for supporting the load in one position near the lower end of the boom, a unitary mechanism for first swinging the boom inwardly and raising the load and thereafter tilting the load into a different position by a continuous action thereof, locking mechanism for securing the boom during the tilting movement of the load, and means tending to restore the tipped boom to its original position upon the releasing of said locking mechanism.

10. The combination of a truck, a boom pivoted thereto, a rotatable load supporting means carried by said boom, winding mechanism carried by the truck including a flexible member leading from the winding mechanism over the boom and connected to the load supporting means whereby the boom may be tipped inwardly thereby raising the load, and means for locking the boom in said tipped position including a remotely controlled catch engaging the boom operable from the driver's position on the truck.

11. The combination of a truck, a boom pivoted thereto, a pulley mounted thereon, means for pivotally supporting a load in vertical position on the boom, locking means secured to the truck adapted to engage the boom, winding mechanism carried by the truck, a cable leading from the winding mechanism over the pulley on the boom connected to the load supporting means whereby the boom and load supporting means may be tipped inwardly with a consequent lowering movement of the load supporting means upon a reverse movement of the winding mechanism.

12. The combination of a truck, a boom pivoted thereto, means for pivotally supporting a load in a vertical position on the boom, means for tipping the boom inwardly thereby raising the load and thereafter tilting the load into a horizontal position on the boom, and locking means for retaining the boom in said tipped position, said locking means being manually controlled from the operator's position on the truck.

13. The combination of a truck, a boom pivoted thereto, a pulley mounted thereon, winding mechanism carried by the truck, a load receiving means, a flexible member leading from the winding mechanism over the pulley on the boom and adapted to raise the load receiving means by swinging the boom inwardly, means adapted to cause further operation of the winding mechanism to tilt the load receiving means into a substantial upright position, a resilient means acting on the boom and arranged to oppose substantially the entire inward movement of the boom and to automatically start the boom to an outward position, whereby tension will be maintained in the flexible member upon a reversal of the winding mechanism throughout substantially the entire outward movement of the boom.

14. The combination of a truck, a boom pivoted thereto, winding mechanism carried by the truck, load supporting means vertically supported by the boom when in normal position, means for locking the boom in a tilted position on the truck, means connecting the winding mechanism with the load supporting means whereby operation of the winding mechanism will first tip the boom and raise the load, and upon reversal of the winding mechanism lower the load into substantial horizontal position while the boom is retained in locked position, and mechanism including a control lever manually operative from the driver's position for releasing the boom subsequent to said load lowering movement.

15. The combination of a truck, a boom pivoted at the rear end of the truck, a load engaging device pivoted to the boom on an axis extending longitudinally of the truck, means for tipping the boom and subsequently turning the load engaging device on its axis and means arranged to be controlled by the operator to arrest movement of the boom in either direction when the load engaging device is turning on its axis after the boom has been tipped to incline the longitudinally extending axis.

16. The combination of a truck, a pivotally mounted boom on the truck, a load engaging member pivotally mounted on the boom, means for causing a relative movement between the boom and the load engaging device and means for automatically latching the boom to render it unmovable while the load engaging member is being rotated.

17. The combination of a truck a boom pivoted thereto, winding mechanism carried by the truck, load handling means pivotally supported by the boom, connections from the winding mechanism to the boom and handling means to cause the boom to be tipped and the load raised upon operation of the winding mechanism, and means controlling the boom to hold it in one of its positions whereby the operation of the winding mechanism will afterward act on the load handling means only, to tilt the load into a position transverse to its previously raised and tipped position.

18. The combination of a truck, a substantially vertical boom pivoted thereto, means for pivotally supporting a load on the lower end of the boom, boom actuating means for causing the load to be tilted into a substantially vertical position and releasable means for holding the boom against tilting movement.

19. The combination of a truck, a tiltable supporting member thereon, a load receiving member pivotally connected to the supporting member, and two holding means, one acting on the supporting member and the other acting on the load receiving member, there being provision for causing the load receiving member to drop to a recumbent position upon the release of the holding means acting thereon.

20. The combination of a truck, a boom tiltably connected thereto, winding mechanism on the truck adapted to tip the boom and raise the load supported adjacent to the boom, additional mechanism for holding the boom tipped, there being provision for causing gravity to tilt the load into substantially horizontal position, upon the release of the winding mechanism, automatic means for stopping the raising and tilting movement of the winding mechanism, and manual means for controlling the lowering movement and stopping it whenever desired.

21. The combination of a truck, a boom tiltably connected thereto, winding mechanism carried by the truck, a load handling member adapted to handle an elongated load, said member being pivotally supported by the boom and being slightly heavier on one side of the pivot than on the other, and means associated with said winding mechanism and coating with said boom and load handling member to tip the boom and raise the load upon operation of said winding mechanism, there being additional means to prevent movement of the boom and thereby cause said load handling member to tilt into a substantially horizontal position upon a subsequent reverse action of the winding mechanism, due to the fact that said member is not truly balanced.

CLYDE E. COCHRAN